United States Patent [19]
Zentz et al.

[11] 3,733,924
[45] May 22, 1973

[54] HYDROMECHANICAL TRANSMISSION
[75] Inventors: Robert J. Zentz; Robert A. Stuttler, both of Rockford, Ill.
[73] Assignee: Sundstrand Corporation, Rockford, Ill.
[22] Filed: Jan. 24, 1972
[21] Appl. No.: 220,289

[52] U.S. Cl.................................................74/687
[51] Int. Cl............................................F16h 47/04
[58] Field of Search.........................................74/687

[56] References Cited
UNITED STATES PATENTS

| | | |
|---|---|---|
| 3,274,855 | 9/1966 | Reynolds et al.........................74/687 |
| 3,303,724 | 2/1967 | Reeves, Jr. ...........................74/687 |
| 3,511,111 | 5/1970 | Eickmann ...............................74/687 |
| 3,600,106 | 8/1971 | Baits et al............................74/687 X |

*Primary Examiner*—Arthur T. McKeon
*Attorney*—Axel A. Hofgren, Ernest A. Wegner, William J. Stellman et al.

[57] ABSTRACT

A hydromechanical high speed drive transmission for driving an aircraft alternator at constant speed even though the speed of the engine fluctuates, including a mechanical differential having an input ring gear, an output ring gear, and a carrier with intermeshing pinions respectively engaging the ring gears, a variable hydrostatic transmission driven with the input gear and connected for controlling rotation of the carrier to vary the speed of the output gear relative to the speed of the input gear, releasable detent means for preventing reverse rotation of the carrier on cold starts, a charge pump driven with the output gear for supplying fluid to the hydrostatic transmission, and means responsive to pressure developed by the charge pump for withdrawing the releasable detent means acting on the carrier.

17 Claims, 5 Drawing Figures

HYDROMECHANICAL TRANSMISSION

BACKGROUND OF THE INVENTION

This invention relates to a hydromechanical constant speed drive transmission for rotating an alternator in an aircraft at constant speed by means of power supplied from a variable speed aircraft engine.

Such systems have been the subject of previous endeavor, as shown in U.S. Pat. Nos. 3,365,981 and 3,576,143, for example. In the prior patents, an input shaft drives a carrier in a mechanical differential wherein the carrier includes intermeshing pinions respectively in mesh with surrounding ring gears, one of which is connected to an output shaft. The other ring gear functions as a control gear in the mechanical differential for varying the speed of the output shaft relative to the speed of the input shaft. The ring gear which is utilized as a control gear in the mechanical differential is controlled by a hydrostatic transmission. The latter includes two rotary hydraulic units, one of which is driven by the input shaft and the other of which is rotatable with the control ring gear. At least one of the hydraulic units includes means for varying the displacement thereof in order to vary the function of the control gear.

In the prior patents, the carrier in the mechanical differential comprises an elongated support having a pair of stationary elongated shafts respectively for supporting the two intermeshing pinions, and the latter each comprise an elongated sleeve with gear teeth on the outside in an arrangement wherein the teeth at one end of one pinion engage one of the ring gears, the teeth at the other end of the other pinion engage the other ring gear, and the intermediate portions of the teeth on the two pinions are in mesh with each other. The relatively long interior surface of each sleeve pinion functions as a bearing surface for the external surface of the associated stationary shaft.

The bearing surfaces of the pinions on the carrier are normally well lubricated, and under operating conditions in relatively warm temperatures, the pinions rotate freely on the stationary supporting shafts and the differential functions in the intended manner. In the event of very cold starts, that is, situations where the aircraft engine and the drive are to be put into operation in very cold ambient temperatures, as low as −65° F., the lubrication thickens, and the pinions sometimes are thereby substantially locked to the supporting shafts, as a result of which the mechanical differential turns as a unitary locked-up assembly without the benefit of differential action until such time as the operation of the device causes adequate warming which softens the lubrication to a place where the pinions on the carrier rotate relative to the carrier.

In the prior devices as illustrated in the patents cited, where the input to the mechanical differential is through the carrier, the input speed of operation falls within a relatively low range on the order of 5,000–9,000 rpm, and the output shaft is driven at a constant speed near 8,000 rpm in the same direction as the carrier. Thus, if the pinions in the differential carrier lock up and the differential rotates as a unit, the output shaft is still driven in a proper direction to rotate the alternator in a generating mode until such time as the pinions are free and the differential action is obtained.

More recently, there has been a need for high speed alternator operation near 12,000 rpm, with input speeds in a range of 9,000–18,000 rpm, and in order to accommodate such speeds, the input to the differential is through one of the ring gears rather than through the carrier, and the carrier functions as the control element in the differential. With such an arrangement, the output shaft rotates in a direction opposite to the direction of rotation of the input ring gear. Thus, in the event the planetary pinions in the carrier become locked to the carrier and the differential rotates as a unit, the output shaft is driven in the wrong direction until such time as the pinions become free, unless provision is made for preventing such reverse rotation. Thus, there is a need for provision of means to prevent reverse rotation of the carrier in installations of the type described.

SUMMARY OF THE INVENTION

The present invention relates to a hydromechanical constant speed drive transmission including a mechanical differential having an input gear, an output gear and a control gear, utilized in conjunction with a hydrostatic transmission associated with the control gear for varying the speed of the output gear relative to the speed of the input gear and releasable detent means for preventing reverse rotation of the control gear on cold starts.

As illustrated herein, the mechanical differential includes a gear carrier rotatable about a predetermined axis, a pair of meshing pinions rotatable on stationary bearings on the carrier about axes parallel to the carrier axis, and a pair of coaxial internal ring gears rotatably mounted concentric about the carrier axis and respectively in mesh with the pinions, and the arrangement includes means connecting one ring gear to an input shaft, means connecting the other ring gear to an output shaft, and means connecting the carrier to the hydrostatic transmission.

The releasable detent means controlling the carrier includes ratchet teeth on the gear carrier, a detent plunger releasably engageable with the ratchet teeth, means normally biasing the detent plunger toward the detent teeth, and selectively operable means for retracting the detent plunger against the biasing means.

Preferably, the detent plunger is retractable by fluid operable means responsive to pressure developed in a charge pump system driven by the differential output, in an arrangement where the charge pump cannot develop pressure until such time as the pinions on the carrier are free in order to provide differential action.

The detent plunger is controlled by a lock plunger releasably engageable with the detent plunger to hold the latter retracted, and the lock plunger is controlled by temperature responsive means which is sensitive to ambient temperature conditions.

DETAILED DESCRIPTION OF PREFERRED EMBODIMENT

Figure 1:
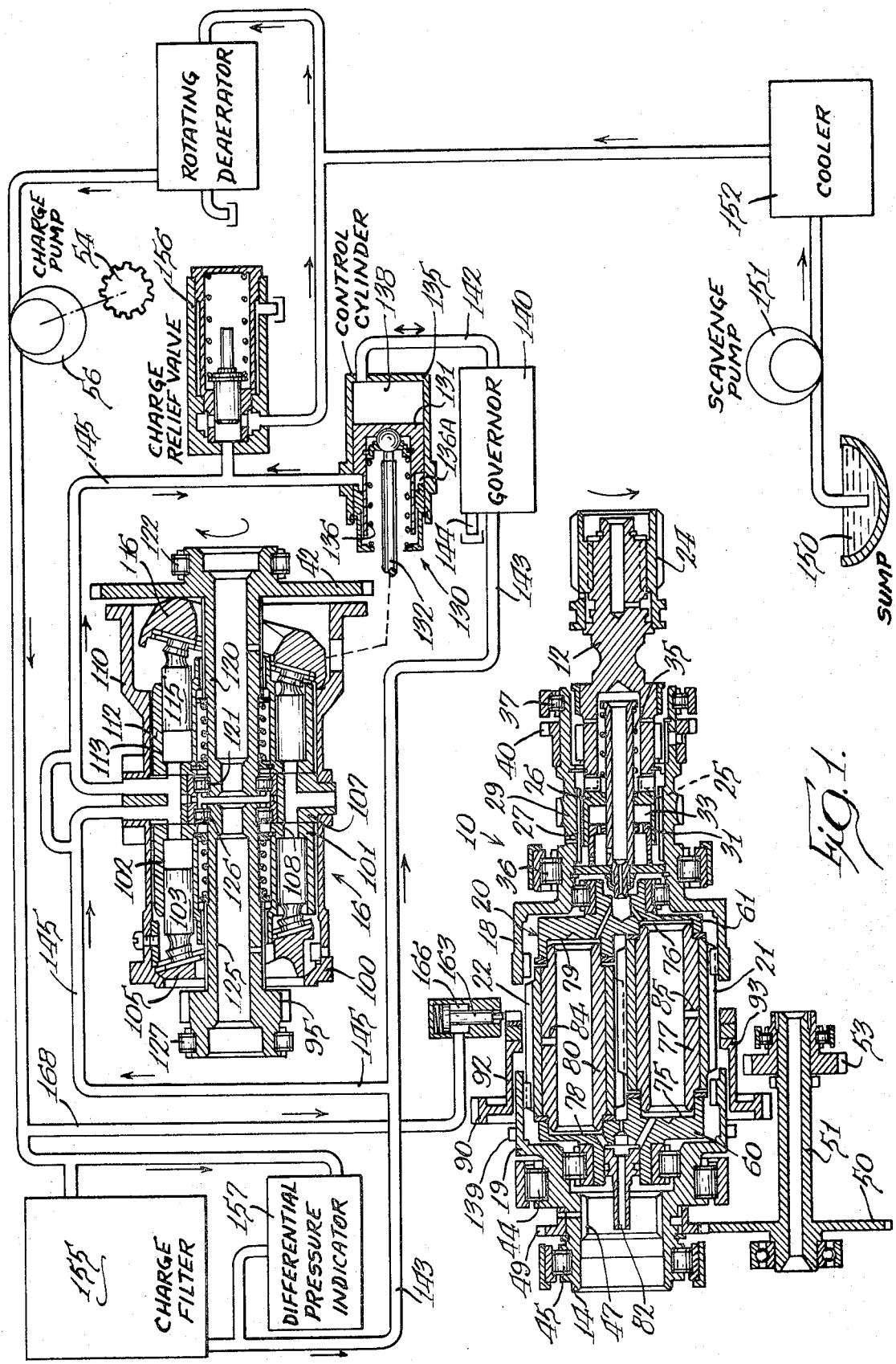
FIG. 1 is a diagrammatic illustration of a hydromechanical constant speed drive transmission embodying the principles of the present invention, wherein components necessary to illustrate the invention are included, and various details are omitted.

Referring now to the drawings in more detail, a hydromechanical constant speed drive transmission embodying the principles of the present invention includes a mechanical differential generally designated 10 having an input shaft 12 adapted to be driven at varying speeds by an aircraft engine, and an output shaft 14 adapted to drive an aircraft generator at constant speed. The speed of the output shaft 14 is varied relative to the speed of the input shaft 12 by means of a hydrostatic transmission generally designated 16, acting on the mechanical differential.

The mechanical differential 10 is illustrated in FIGS. 1, 2, 4 and 5, and includes an input ring gear 18, an output ring gear 19, and a gear carrier 20 having a pair of intermeshing planetary pinions 21 and 22 which respectively engage the ring gears 18 and 19.

The input ring gear 18 is driven by the input shaft 12. The latter includes a pinion 24 adapted to be driven by an aircraft engine. At the opposite end of the shaft 12 from the pinion 24, it is formed with axially directed clutch teeth 25 engaging complementary teeth on a decoupler member 26 which in turn has external splines engaging internal splines 27 on a sleeve extension 29 of the input ring gear 18. The disconnect coupling member 26 is of hollow tubular configuration and is mounted on a support 31 in the nature of a piston which, with the member 26, forms a chamber 33 normally filled with wax or other thermally responsive material. The wax or other thermally responsive material is normally in a solid state so as to hold the disconnect coupling member 26 with its clutch teeth engaged with the clutch teeth 25 on the input shaft 12, against the bias of a disconnect spring 35. In the event of excessive temperature, the wax or other material in the chamber 33 is adapted to melt and flow out of the chamber 33 through apertures in the support 31 as the spring 35 forces the disconnect coupling toward the left as viewed in FIG. 1 to a position where the teeth on the disconnect coupling member 26 disengage the teeth on the input shaft to interrupt the drive connection.

The input shaft 12 is coupled to drive the input ring gear 18 in the manner described above, and the extension 29 from the input ring gear 18 is adapted to be mounted in bearings as at 36 and 37 in a suitable housing (not shown). The sleeve extension 29 carries a gear 40 fixed thereon and adapted to engage a gear 42 in the hydrostatic transmission 16 for purposes which will appear presently.

The output ring gear 19 and integral output shaft 14 are mounted in bearings 44 and 45, and the output shaft is formed with internal splines 47 adapted to be drivingly connected with the aircraft generator or alternator which is to be driven by the drive transmission illustrated. In order to drive appropriate pump mechanism for supplying charge fluid and control fluid to the hydrostatic transmission, the output shaft 14 is provided with an external gear 49 engaging a gear 50 on a shaft 51. The shaft 51 carries one or more gears as at 53 for purposes of driving a gear 54 associated with a charge pump 56, the purpose of which will appear presently.

The carrier 20 comprises a pair of similarly shaped generally cylindrical housing members 60 and 61 having reduced projecting end portions 62 and 63 mounted respectively in bearings 64 and 65 respectively supported in the ring gears 19 and 18. Remote from the projecting end portions 62 and 63, the housing members 60 and 61 are formed with outwardly extending annular flanges 68 and 69 which abut each other and are secured together as by bolts at 70 in a manner to provide a unitary housing construction which rotatably supports the planetary pinions 21 and 22.

In order to rotatably support the pinions 21 and 22, the housing member 60 is formed with a recess or socket 75, and the housing member 61 is formed with a similarly shaped socket or recess 76, and the recesses 75 and 76 receive the reduced opposite end portions of a hollow stationary shaft 77, the outer surface of which provides a bearing support for rotatably mounting the pinion 21. In order to support the pinion 22, the housing member 60 is formed with a recess 78, and the housing member 21 is formed with a recess 79 which receives opposite ends of a stationary bearing shaft 80 on which the pinion 22 is rotatable. As appears on viewing FIG. 1, intermediate portions of the pinions 21 and 22 are in mesh with each other, whereas one end portion of the pinion 21 engages the ring gear 18, and one end portion of the pinion 22 engages the ring gear 19. Normally, lubrication is supplied to the interior of the stationary hollow shafts 77 and 80 through a lubrication conduit 82, and the hollow shafts contain ports or passages as at 84 and 85 for admitting the lubrication to the interengaged bearing surfaces of the pinions and the supporting shafts, as a result of which the relatively long bearing contact surfaces are properly lubricated at all times.

Figure 2:
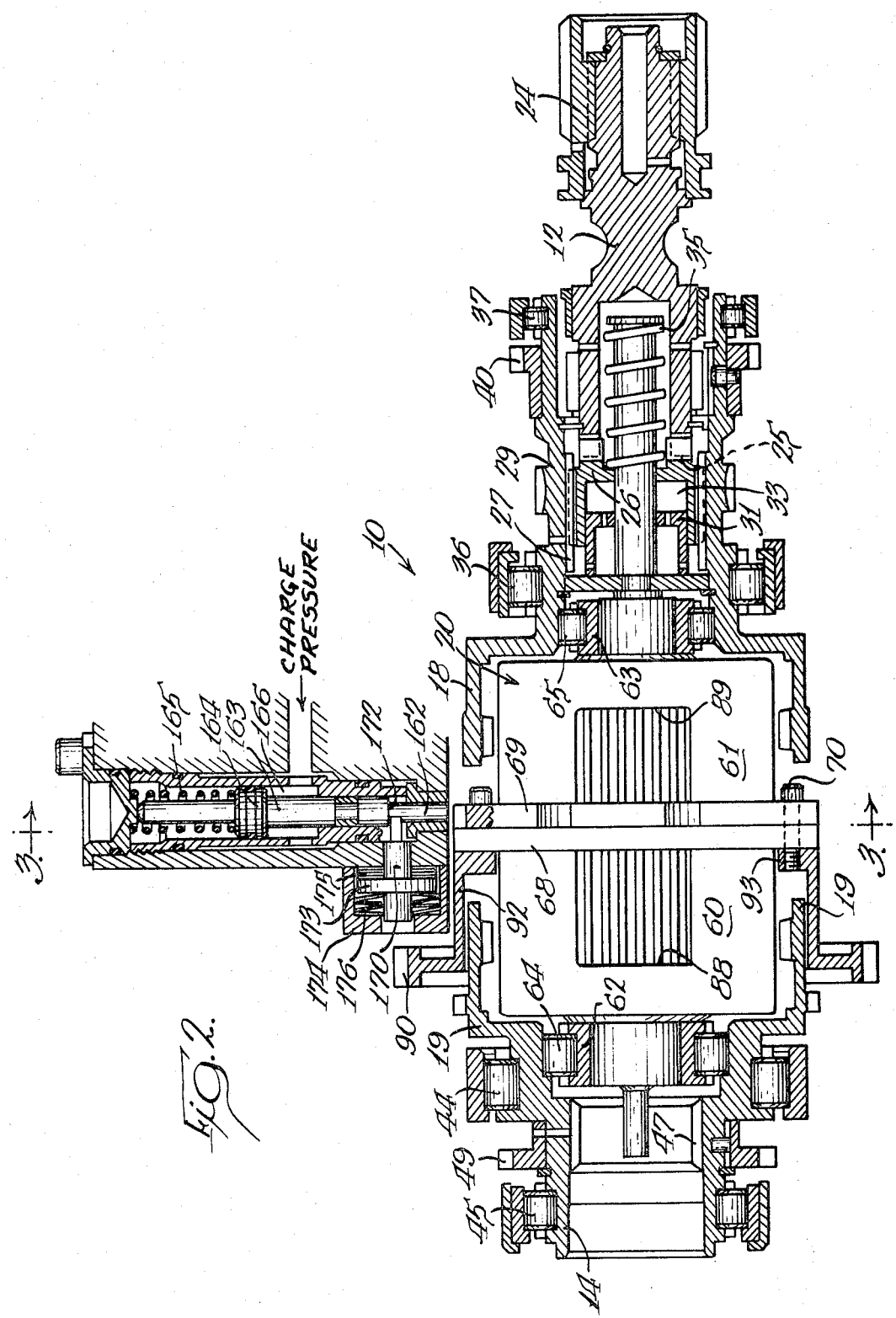
FIG. 2 is an enlarged longitudinal sectional view through the mechanical differential and releasable detent means therefor.

As seen in FIG. 2, the carrier housing members 60 and 61 are formed with peripheral recesses as at 88 and 89 appropriately located to permit contact of the teeth of the ring gears 18 and 19 with the teeth of the planetary pinions 21 and 22.

In order to control the mechanical differential in a manner to vary the speed of the output shaft 14 relative to the speed of the input shaft 12, so as to maintain a constant output speed in spite of variations in the input speed, rotation of the carrier 20 is controlled by the hydrostatic transmission 16. In order to control the direction of rotation of the carrier and the speed of rotation of the carrier, a gear 90 is secured to the carrier for rotation therewith. As seen in FIGS. 1 and 2, the gear 90 is an annular ring-shaped gear with external teeth projecting outwardly from a sleeve or tubular support 92 having an inwardly directed annular flange 93 which is secured to the flanges 68 and 69 on the housing members 60 and 61. In order to control the carrier with the hydrostatic transmission, the gear 90 is adapted to mesh with a gear 95 in the hydrostatic transmission for purposes that will appear more clearly presently.

As best seen on reference to FIG. 1, the hydrostatic transmission 16 includes a pair of rotary axial piston hydraulic units connected in closed hydraulic circuit. One of the hydraulic units is a fixed displacement hydraulic unit including a housing 100 having a rotatable cylinder block 101 with an annular array of axially disposed cylinders as at 102 having reciprocable pistons 103 engaging a fixed cam or swashplate 105. The end of the cylinder block 101 remote from the cam 105 rotates against the surface of a centrally located valve plate 107, and the cylinders 102 include ports 108 which communicate with appropriate valving in the valve plate 107 so that fluid under pressure is delivered from one of the hydraulic units to the other and returned from the other to the one.

A second variable displacement hydraulic unit includes a housing 110 with a rotatable cylinder block 112 having cylinders 113 with pistons 115 engaging a cam or swashplate 116 which is adjustable in opposite directions from a neutral central position so that the displacement of the unit may be varied and the delivery of the unit may be reversed.

A shaft 120 in the variable hydraulic unit is rotatably mounted in bearings 121 and 122. The shaft is connected by appropriate splines to rotate with the cylinder block 112 and additionally carries the previously mentioned gear 42 adapted to be driven by the input shaft 12. A shaft 125 in the fixed displacement unit is appropriately mounted in bearings 126 and 127. Shaft 125 is connected by appropriate splines to rotate with the cylinder block 101 in the fixed unit, and carries the previously mentioned gear 95 adapted to mesh with the gear 90 on the carrier in the mechanical differential.

The angle of the cam 116 in the variable hydraulic unit is controlled by a piston and cylinder device 130 which includes a piston 131 connected by a piston rod 132 to the cam 116. The piston 131 reciprocates in a cylinder 135 and is biased toward the right as viewed in FIG. 1 by a compression spring 136 and by fluid pressure in chamber 136A. The piston 131 is movable to the left as viewed in FIG. 1 against the bias of the spring 136 by introduction of fluid under pressure into a chamber 138 in the cylinder 135.

Flow of control fluid to and from the chamber 138 is controlled by a governor 140 which includes a valve member for controlling communication of a control passage 142 with either a supply passage 143 or a drain passage 144. The governor 140 may be similar to that shown and described in the aforementioned U.S. Pat. No. 3,365,981, and need not be completely described in detail herein. The governor includes a rotary head driven by a gear 139 on the output ring gear 19 so as to reflect output speed. The head includes flyweights adapted to control the valve member in a manner to port control fluid under pressure from the passage 143 to the passage 142 when the output speed falls below a predetermined value, and to port fluid under pressure from the passage 142 to the drain port 144 when the speed of the output shaft increases above a predetermined value. On initiating operation of the drive, the supply of fluid under pressure to chamber 138, positions the swashplate 116 to the position as illustrated in FIG. 1, causing the variable unit to supply fluid to the fixed displacement unit, and thereby add speed to the input in the mechanical differential for purposes of producing an output speed greater than input speed. Conversely, when the chamber 138 is ported to drain, the spring 136 and fluid pressure in chamber 136A moves the piston in a direction to reduce displacement of the variable unit, thereby to reduce the speed added in the differential.

Control fluid under pressure is supplied to the passage 143 for the governor 140 from the charge pump 56. Fluid for the charge pump 56 is collected from a sump or reservoir 150 in a housing containing the mechanical differential and the hydrostatic transmission by means of a scavenge pump 151 which delivers such fluid through a cooler 152 and through a deaerator 153, and thence to the charge pump 56. The fluid is delivered from the charge pump 56 through a filter 155 and then to the conduit 143 leading to the governor. A branch conduit 145 supplies makeup fluid to the closed hydraulic circuit connecting the hydraulic units in the transmission 16. The pressure of fluid in the conduit 145 is regulated by a charge relief valve 156, from which fluid is returned to the deaerator 153. The pressure drop across the filter 155 is sensed by a differential pressure indicator 157 which indicates the extent of clogging in the filter and the necessity for replacement.

Figure 4:
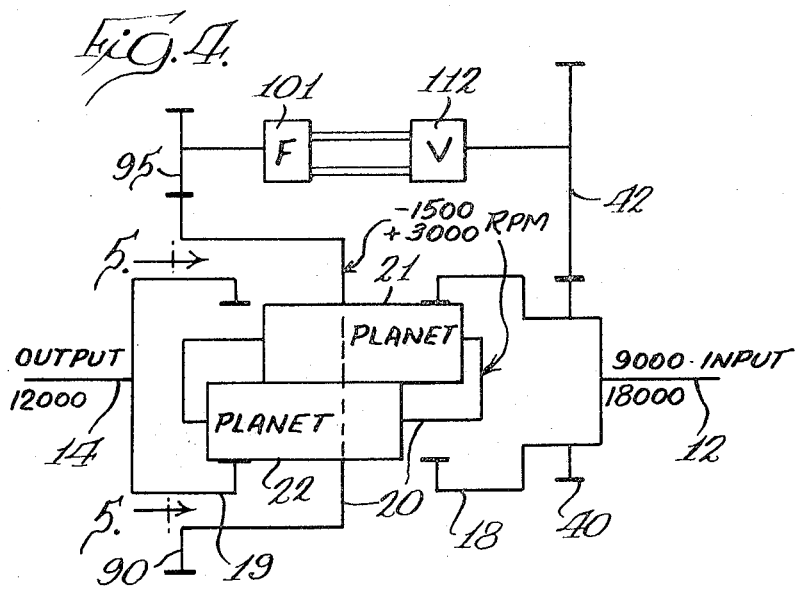
FIG. 4 is a schematic illustration of the transmission.
Figure 5:
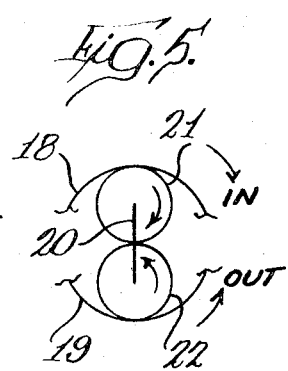
FIG. 5 is a fragmentary end elevation taken at about the line 5—5 on FIG. 4.

In operation of the device as thus far described, and referring primarily to FIGS. 4 and 5 for the purpose of simplicity, and initially assuming that the carrier 20 is stationary, it will be understood on reference to FIG. 5 that rotation of the input ring gear 18 in a clockwise direction results in rotation of the output ring gear 19 in a counterclockwise direction by virtue of the interaction of the planetary pinions 21 and 22 on the stationary carrier. In such condition, with the carrier stationary, the output shaft 14 will be driven at the same speed as the input shaft 12. Such condition may exist for a limited period of time when the drive is straight through the differential as the input shaft passes through 12,000 rpm, the desired speed of the output shaft 14.

When the input shaft 12 is rotating at a speed less than the desired output speed, the input shaft drives the variable unit 112 as a pump which drives the fixed displacement unit 101 in a direction to rotate the carrier 20 counterclockwise in order to add speed to the differential for purposes of maintaining an output speed greater than the input speed. When the speed of the input shaft exceeds the desired speed of the output shaft, the carrier gear 90 rotates the fixed displacement unit 101 as a pump, the gear 90 rotating in a clockwise direction, in a manner such that the hydrostatic transmission subtracts from the input speed in a manner to maintain the output speed at 12,000 rpm. In the latter mode of operation, the variable unit 112 is driven as a motor and adding power to the input shaft, and the displacement is varied so that the device functions as a metering device constituting a load on the fixed unit which is operating as a pump. In this mode, the swashplate in the variable unit is overcenter from the position illustrated in FIG. 1. Thus, when the output speed increases above that desired, the governor 140 connects the chamber 130 to drain, and the displacement of the variable unit is increased in a manner to subtract additional speed from the input speed in the differential.

As illustrated in FIG. 5, the input shaft rotates in a direction opposite from the desired rotation of the output shaft. Thus, in the event of very severely cold starts, where the lubrication might cause the pinions 21 and 22 in the carrier 20 to stick to the stationary shafts so that there is no differential action in the differential, and the latter rotates as a unit, the tendency would be for the input shaft to drive the output shaft in the wrong direction. Rotation in the wrong direction would have the effect of driving the charge pump and the scavenge pump in the wrong direction, as a result of which there would be no charge pressure developed.

In order to prevent reverse operation of the output shaft on cold starts, provision is made for releasably detenting the carrier against reverse rotation during starting and pending the development of appropriate charge pressure which indicates rotation of the output shaft in the proper direction.

In order to releasably detain the carrier 20 against reverse rotation, the outwardly extending annular flange 69 on the housing member 61 in the carrier 20, rotatable with the carrier, is formed with a series of recesses as at 160 which have the effect of providing a series of ratchet teeth adapted to cooperate with a detent plunger 162 reciprocably mounted for movement toward and away from the ratchet teeth. The detent plunger 162 is connected with a piston rod 163 carrying a piston 164 which is biased by a spring 165 in a direction such that the plunger is urged toward the flange 69 with the ratchet teeth. The plunger 162 is adapted to be retracted away from the ratchet teeth in the flange 69 by admission of fluid under pressure to a chamber 166 where the fluid acts in opposition to the spring 165.

Figure 3:
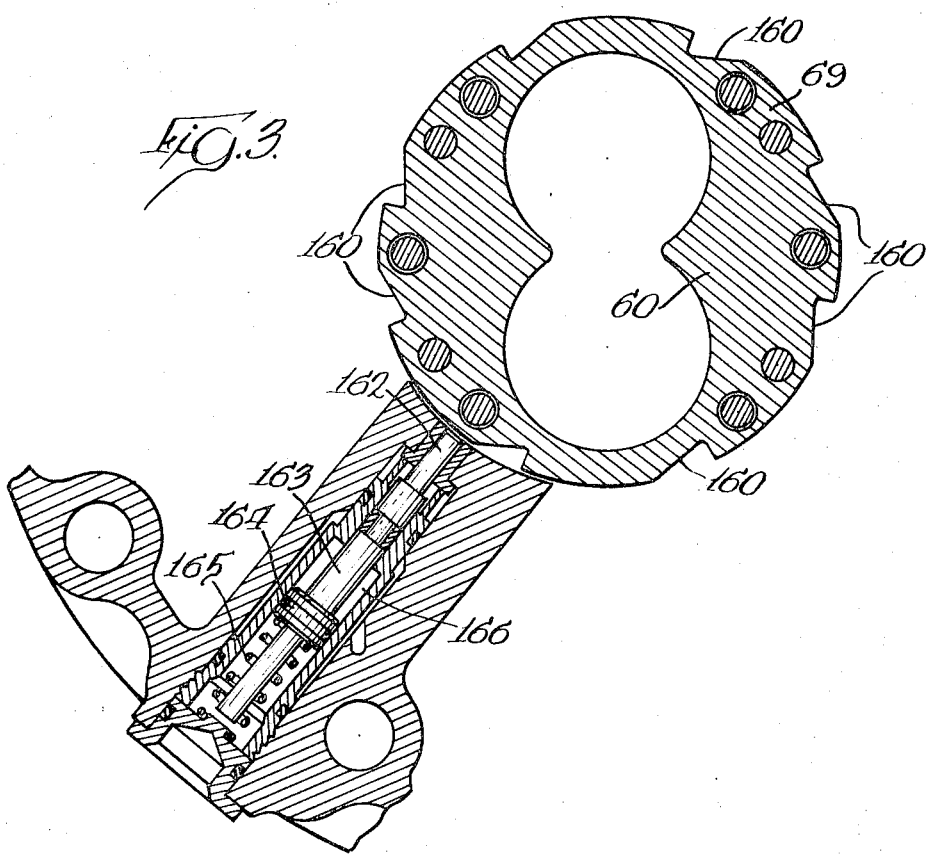
FIG. 3 is a transverse sectional view taken at about the line 3—3 of FIG. 2.

As seen in FIG. 1, fluid under pressure is supplied to the chamber 166 through a passage 168 which is supplied from the charge pump 56. Thus, when the charge pump 56 develops pressure, indicating that the output shaft is rotating properly, the detent 162 is withdrawn from the recesses 160, and the carrier is then free to operate reversely, in a clockwise direction, as viewed in FIG. 5, when the speed of the input shaft exceeds the desired speed of the output shaft. It should be noted that the detent 162 and the ratchet teeth 160 cooperate in a manner only to prevent clockwise rotation of the carrier as viewed in FIGS. 3 and 5, and not to prevent counterclockwise rotation of the carrier which is the manner in which the carrier initially rotates upon initiation of operation of the drive.

In order to lock the detent plunger 162 in retracted position after the desired normal operation is established, a lock plunger 170 (FIG. 2) is adapted to engage a shoulder 172 on the plunger 162, to hold the plunger 162 in retracted position. The lock plunger 170 includes an enlarged disc 173 which is reciprocable in a housing 174. On opposite sides of the disc 173, the plunger 170 carries bimetal washer means as at 175 and 176 provided for purposes of actuating the plunger 170 in opposite directions. As illustrated in FIG. 2, the bimetal 176 is adapted to expand when the ambient temperature reaches a predetermined high value sufficient that normal operation of the transmission may be expected. Expansion of the bimetal washer means 176 causes movement of the lack plunger 170 toward the extended position illustrated in FIG. 2 wherein the detent plunger 162 is locked in the retracted position so that the carrier is free to rotate in either direction. When the ambient temperature is very low and the carrier 20 ought to be locked against clockwise rotation, the bimetal washer means 175 expands to retract the lock plunger 170 from engagement with the detent plunger 162, so that the latter may move to an extended position under the urging of the spring 165, as a result of which the plunger 162 engages the recesses 160, holding the carrier against clockwise rotation.

We claim:
1. A hydromechanical transmission, comprising,
 a. a mechanical differential including
  a-1. an input gear,
  a-2. an output gear, and
  a-3. a control gear,
 b. a hydrostatic transmission including
  b-1. a pair of hydraulic units connected in hydraulic circuit,
  b-2. means connecting one hydraulic unit to rotate with the input gear,
  b-3. means connecting the other hydraulic unit to rotate with the control gear, and
  b-4. means for varying the displacement of one hydraulic unit,
 c. means for controlling the displacement varying means, and
 d. releasable means preventing reverse rotation of the control gear on cold starts.

2. A hydromechanical transmission as defined in claim 1, wherein the releasable means comprises
 detent teeth on the control gear, and a detent pawl releasably engageable with the detent teeth.

3. A hydromechanical transmission as defined in claim 2, including
 means normally biasing the detent pawl toward the detent teeth, and
 fluid operable means for retracting the detent against the biasing means.

4. A hydromechanical transmission as defined in claim 2, including
 a lock pawl releasably engageable with the detent pawl for holding the detent pawl released.

5. A hydromechanical transmission as defined in claim 4, including
 temperature responsive means for extending the lock pawl toward the detent pawl when the ambient temperature reaches a predetermined value.

6. A hydromechanical transmission, comprising,
 a. an input shaft adapted to be drivingly connected to a source of power,
 b. an output shaft adapted to be drivingly connected to a device to be driven at a controlled speed,
 c. a mechanical differential including
  c-1. an input gear rotatable with the input shaft,
  c-2. an output gear rotatable with the output shaft, and
  c-3. a control gear,
 d. a hydrostatic transmission including
  d-1. a pair of hydraulic units connected in closed hydraulic circuit,
  d-2. means connecting one hydraulic unit to rotate with the input shaft,
  d-3. means connecting the other hydraulic unit to rotate with the control gear, and
  d-4. means for varying the displacement of one hydraulic unit,
 e. means for controlling the displacement varying means to vary the speed of the output shaft relative to the speed of the input shaft, and
 f. releasable means preventing reverse rotation of the control gear on cold starts.

7. A hydromechanical transmission, comprising,
 a. an input shaft adapted to be drivingly connected to a source of power,
 b. an output shaft adapted to be drivingly connected to a device to be driven at a controlled speed,
 c. a mechanical differential including
  c-1. an input gear rotatable with the input shaft,
  c-2. an output gear rotatable with the output shaft, and c-3. a control gear, d. a variable transmission for controlling the control gear to vary the speed of the output shaft relative to the speed of the input shaft, and e. releasable means preventing reverse rotation of the control gear on cold starts.

8. A hydromechanical transmission as defined in claim 7, wherein the releasable means comprises detent teeth on the control gear, a detent pawl releasably engageable with the detent teeth, means normally biasing the detent pawl toward the detent teeth, and fluid operable means for retracting the detent against the biasing means.

9. A hydromechanical transmission as defined in claim 8, including a lock pawl releasably engageable with the detent pawl for holding the detent pawl released, and temperature responsive means for extending the lock pawl toward the detent pawl when the ambient temperature reaches a predetermined value.

10. A hydromechanical transmission, comprising, a. an input shaft adapted to be drivingly connected to a source of power, b. an output shaft adapted to be drivingly connected to a device to be driven at a controlled speed, c. a mechanical differential including,
   c-1. a gear carrier rotatable about a predetermined axis,
   c-2. a pair of meshing pinions rotatable on the carrier about axes parallel to the carrier axis, and
   c-3. a pair of internal ring gears rotatable respectively in mesh with the pinions, d. means connecting one ring gear to rotate with the input shaft, e. means connecting the other ring gear to rotate with the output shaft, f. a hydrostatic transmission including
   f-1. a variable displacement hydraulic unit rotatable with the input shaft,
   f-2. a second hydraulic unit rotatable with the carrier, and
   f-3. conduit means connecting the two units in closed hydraulic circuit, g. means to control the variable displacement hydraulic unit, to vary the displacement of the output shaft relative to the speed of the input shaft, and h. releasable detent means for preventing reverse rotation of the carrier on cold starts.

11. A hydromechanical transmission as defined in claim 10, wherein the releasable detent means comprises ratchet teeth on the gear carrier, a detent plunger releasably engageable with the ratchet teeth, means normally biasing the detent plunger toward the detent teeth, and selectively operable means for retracting the detent plunger against the biasing means.

12. A hydromechanical transmission as defined in claim 11, including a lock plunger releasably engageable with the detent plunger to hold the latter retracted, and temperature responsive means controlling the lock plunger.

13. A hydromechanical transmission as defined in claim 12, wherein the temperature responsive means comprises metallic temperature responsive washer means on the lock plunger for extending the lock plunger in event of predetermined high ambient temperature.

14. A hydromechanical transmission as defined in claim 12, wherein the temperature responsive means comprises metallic temperature responsive washer means on the lock plunger for retracting the lock plunger in event of predetermined low ambient temperature.

15. A hydromechanical transmission, comprising, a. an input shaft adapted to be drivingly connected to a source of power, b. an output shaft adapted to be drivingly connected to a device to be driven at a controlled speed, c. a mechanical differential including,
   c-1. a gear carrier rotatable about a predetermined axis,
   c-2. a pair of elongate meshing pinions rotatable on stationary bearing shafts on the carrier about axes parallel to the carrier axis, and
   c-3. a pair of coaxial internal ring gears rotatably mounted concentric about the carrier axis and respectively in mesh with the pinions, d. means connecting the input shaft to rotate one ring gear, e. means connecting the other ring gear to rotate the output shaft, f. a hydrostatic transmission including
   f-1. a variable displacement hydraulic unit driven by the input shaft,
   f-2. a second hydraulic unit rotatable with the carrier,
   f-3. conduit means connecting the two units in closed hydraulic circuit, and
   f-4. means responsive to the speed of the output shaft to control the variable displacement hydraulic unit to maintain constant output speed, g. a charge pump driven by the output shaft to supply fluid to the hydrostatic transmission, h. detent means preventing reverse rotation of the carrier on cold starts, and i. means responsive to charge pressure for releasing the detent means.

16. A hydromechanical transmission as defined in claim 15, wherein the releasable detent means comprises ratchet teeth on the gear carrier, a detent plunger releasably engageable with the ratchet teeth, and means normally biasing the detent plunger toward the detent teeth.

17. A hydromechanical transmission as defined in claim 16, including a lock plunger releasably engageable with the detent plunger to hold the latter retracted, and temperature responsive means controlling the lock plunger.

* * * * *